United States Patent [19]

Meredith et al.

[11] Patent Number: 4,764,563
[45] Date of Patent: Aug. 16, 1988

[54] CLEAR IMPACT MODIFIER FOR PVC

[75] Inventors: Frank L. Meredith, Parkersburg; Lewis E. Ferguson, Vienna, both of W. Va.

[73] Assignee: Borg-Warner Chemicals, Inc., Parkersburg, W. Va.

[21] Appl. No.: 20,283

[22] Filed: Feb. 27, 1987

Related U.S. Application Data

[63] Continuation-in-part of Ser. No. 794,362, Nov. 4, 1985, abandoned.

[51] Int. Cl.⁴ .................. C08F 279/02; C08F 279/04; C08F 291/00; C08L 55/02
[52] U.S. Cl. ...................... 525/316; 525/86; 525/932
[58] Field of Search .................... 525/316, 932, 86

[56] References Cited

U.S. PATENT DOCUMENTS

| 3,073,798 | 1/1963 | Baer | 525/932 |
| 3,636,138 | 1/1972 | Beer | 525/86 |
| 3,657,390 | 4/1972 | Tanaka et al. | 525/86 |
| 3,657,391 | 4/1972 | Curfman | 525/86 |
| 3,792,125 | 2/1974 | Wefer | 525/932 |
| 3,900,528 | 8/1975 | Beer | 525/932 |
| 3,900,529 | 8/1975 | Baer | 525/932 |
| 4,287,316 | 9/1981 | Kaneko et al. | 525/316 |
| 4,587,294 | 5/1986 | Matsubara et al. | 525/316 |

FOREIGN PATENT DOCUMENTS 841849 7/1960 United Kingdom .
1207070 5/1963 United Kingdom .

Primary Examiner—Allan M. Lieberman
Attorney, Agent, or Firm—Emily A. Richeson

[57] ABSTRACT

PVC impact modifier composition and clear modified PVC comprising PVC and a graft copolymer including from 60 to 70 wt % of a butadiene based rubber grafted with 40 to 30 wt % of a styrenic composition and a ethylenically unsaturated nitrile in a ratio of about 3/1 to 5/1. These compositions have excellent clarity and good impact properties.

6 Claims, No Drawings

CLEAR IMPACT MODIFIER FOR PVC

CROSS REFERENCE AND RELATED APPLICATION

This application is a continuation-in-part of U.S. patent application Ser. No. 794,362 filed on Nov. 4, 1985, now abandoned.

BACKGROUND OF THE INVENTION

This invention relates to clear, impact modified resins, and more particularly to clear impact modifiers for thermoplastic resins. Still more particularly, this invention relates to impact modifiers for use in producing clear, impact modified polyvinyl chloride (PVC) formulations.

Polyvinyl chloride resins are well known as thermoplastic molding resins, and have achieved wide acceptance commercially for a great variety of applications. When unplasticized or only slightly plasticized, PVC resins are generally quite brittle; the use of rubbery impact modifiers to overcome this deficiency has been practiced for over thirty years. Typical of the impact modifiers developed for this purpose are those based on graft copolymers, as shown for example in U.S. Pat. No. 3,073,798.

An additional property of PVC that is important for many applications is its inherent clarity and transparency. Many of the impact modifiers initially developed for use with PVC greatly reduced clarity and transparency, and considerable effort has been devoted to developing improved impact modifiers that do not exhibit this deficiency. A variety of methods for preparing clear PVC impact modifiers have since been developed, and a great many such modifiers are now commercially available. The method most frequently used is based on matching the apparent refractive index of the impact modifier to that of PVC. For example, the method taught in U.S. Pat. No. 3,657,390 requires the use of two different graft copolymers, one having a refractive index above that of PVC and the second having a refractive index below PVC, in an appropriate ratio. In U.S. Pat. No. 3,636,138, a complex preparation of a two-stage graft copolymer is set forth wherein careful selection of the grafting monomers in each stage is used to adjust the apparent refractive index of the resulting composite graft copolymer. In U.S. Pat. No. 3,657,391 there is disclosed a clear impact modifier prepared by grafting a diene-vinylaromatic rubber substrate having a refractive index matching PVC with a narrowly specified combination of grafting monomers also having a refractive index matching PVC.

According to these references, the adjustment and matching of refractive index for these impact modifiers has depended in part upon the use of acrylate monomers in the grafting phase. As pointed out in U.S. Pat. No. 3,636,138, grafting a rubber substrate having a refractive index to one side of that of PVC with a monomer mixture having a refractive index to the other side of PVC to achieve the requisite matching is known, and alkyl acrylates, particularly methyl methacrylates are most often used for this purpose. However, the presence of acrylate monomers, and particularly methacrylates, is said to reduce optimum adhesion to PVC, and the requisite clarity is thus achieved with some compromise of other properties.

Acrylonitrile-butadiene-styrene (ABS) graft copolymers have long been known as excellent impact modifiers for PVC resins. However, these ABS resins have generally not been useful where superior clarity and color of the impact modified composition is important. According to the teachings of the references, clarity is only accomplished with ABS compositions that do not give good impact modification.

A method for producing clear ABS impact modifiers, particularly for use in PVC compositions, would thus be a useful advance in the compounding art.

SUMMARY OF THE INVENTION

This invention relates to improved clear impact modifiers based on ABS graft copolymers. The modifiers are prepared by grafting particular ratios of styrene and acrylonitrile on butadiene based rubber substrates. PVC compositions prepared with the impact modifiers of this invention exhibit unexpected clarity and transparency together with good impact resistance.

DETAILED DESCRIPTION

The impact modifiers of this invention are ABS graft copolymer resins prepared by graft polymerizing particular ratios of styrene and acrylonitrile in the presence of particular styrene-butadiene rubber substrates.

The butadiene based rubber substrates useful in preparing the impact modifiers of this invention are conventional copolymers of styrene and butadiene and optionally including up to 15 wt% of acrylonitrile and/or an alkyl acrylate in which the alkyl group contains 4 or more carbon atoms, and comprise from 78 to 95 wt% butadiene and from 22 to 5 wt% styrene. The rubber substrate may further include up to 2 wt% of additional copolymerizable cross-linking monomers such as divinylbenzene, triallylcyanurate or the like, up to 2 wt% of chain transfer agents, such as tertiary dodecyl mercaptan, and up to 2 wt% of graft enhancers such as allyl methacrylate, diallyl maleate and the like. Diene polymer and copolymer rubbers are well known and widely employed commercially for a number of purposes. The preparation of such rubbers may be accomplished by any of a variety of processes well known and conventionally used. Particularly useful are emulsion polymerization processes which provide the rubber in latex form suitable for use in subsequent graft polymerization processes. The particle size of the rubber substrate used in preparing the impact modifier does not significantly affect clarity. However, as is well known in the art, large particle size rubber substrates provide generally more effective impact modification, while smaller particle size substrates reduce the tendency of impact modified compositions toward stress whitening behavior. The particular particle size selected will thus be a matter of choice, and depend upon the particular impact and stress whitening characteristics desired in final, impact modified compositions. Methods for producing rubber substrates suitable for grafting and having nearly any desired particle size distribution are well known in the art.

The impact modifiers are prepared by graft polymerizing from about 40 to about 70, preferably from 47 to 61 parts by weight of a grafting monomer mixture comprising a monovinyl aromatic compound (MVA), such as styrene, a methyl styrene, p methyl sytryene or a combination thereof and an ethylenicaly unsaturated nitrile (EUN) such acrylonitrile and/or methacrylonitrile in the presence of 100 parts by weight of butadiene based rubber substrate. The impact modifier is thus a high rubber graft copolymer having a rubber content of from about 60 to about 70 wt%, preferably from 62 to 68 wt% and, correspondingly, a graft monomer component or superstrate of from about 40 to 30, preferably from 38 to 32 wt%.

The weight ratio of the MVA to the EUN in the grafting monomer mixture will be in the range of from 3/1 to 5/1, and preferably, from 3.8/1 to 4.2/1. The precise ratio of the MVA to the EUN selected will depend on the refractive index of the rubber substrate used, and the amount of grafting monomer mixture to be charged. Thus, for some application, MVA/EUN ratios as low as 2.8/1 may be employed with appropriate substrates; however, these are not preferred. More specifically, butadiene based rubber substrates within the composition range set forth herein above will have a refractive index slightly below that of PVC. Monomer mixtures of MVA and EUA having a MVA/EUN ratio of about 4/1, and more generally, a ratio in the range of 3.8/1 to 4.2/1, will have a refractive index slightly above that of PVC. The precise ratio selected for use with a particular substrate will be that ratio which, when combined with the substrate in the amount employed, will provide an apparent refractive index substantially equal to that of the PVC. In general, the apparent refractive index of the graft copolymer will lie in the range 1.5500 to 1.5320, for use with most PVC resins.

The method for matching refractive indices by combining a substrate and a grafting superstrate differing in their refractive indices is well known and described in the art. However, as set forth for example in U.S. Pat. No. 3,636,138, it has widely been believed that when applied to compositions based on diene substrates grafted with styrene and acrylonitrile, the resulting compositions would be less than optimum for use as impact modifiers. It is therefore surprising that PVC compositions based on the ABS impact modifiers of this invention exhibit good impact properties together with excellent clarity and transparency.

The graft polymerization of the MVA/EUN monomer mixture in the presence of the rubbery substrate may be carried out by any of the graft polymerization processes well known and widely used in the polymerization art for preparing ABS resins, including emulsion, suspension and bulk processes. Typical of such processes are emulsion graft polymerization processes wherein the grafting monomers are added, together with surfactants and chain transfer agents as desired, to an emulsion latex of the rubbery substrate and polymerized using an initiator. The initiator may be any of the commonly used free-radical generators including peroxides such as dicumyl peroxide or azo initiators such as azobisisobutyronitrile. Alternatively, any of the variety of redox polymerization catalysts such as the combination of cumene hydroperoxide with ferrous sulfate and sodium formaldehyde sulfoxylate which are well known and widely used in such processes may be employed. The graft polymerization process used in the preparation of the impact modifiers of this invention, as well as those processes used in coagulating and isolating the impact modifier for further use, are thus well-known and conventional, and the application of such processes to the preparation of the impact modifiers of this invention will be readily apparent to those skilled in the art.

The PVC resins that may be used to provide clear transparent impact modified compositions according to the practice of this invention are conventional polymers of vinyl chloride, including copolymers thereof containing greater than 80 wt% vinyl chloride. Representative of copolymerizable monomers useful in preparing such vinylchloride copolymers are vinylidene halides, acrylic and methacrylic compounds, vinyl ethers and vinyl esters. The PVC resins useful in the practice of this invention are widely available from commercial sources in a variety of molding and extrusion grades. Transparent, impact modified PVC compositions may readily be prepared by conventional means, such as for example, by melt-compounding a mixture of 100 parts by weight PVC resin and from 5 to 40 parts by weight of the impact modifier of this invention. The composition may further include stabilizers, antioxidants lubricants, toners, colorants, dyes and the like as is commonly practiced in the art of compounding clear impact modified PVC resins. Compounding may be accomplished by conventional means, including Banbury mixers, heated roll mills, compounding extruders or the like. Alternatively, for many applications the components will be mixed in powdered form, using any of a variety of high intensity mixers, to provide a dry powdered composition which will then be fabricated by methods such as calendaring, milling, blow molding and the like.

The practice of this invention will be better understood by consideration of the following Examples. These Examples are provided by way of illustration of the invention and are not intended to be limiting.

EXAMPLES 1–9

Preparation of Grafts on Butadiene Based Substrates

Butadiene based rubber substrates were prepared by charging a stirred polymerization reactor with 150 pbw demineralized water, 0.05 pbw potassium persulfate, 0.1 pbw tetrasodium pyrophosphate, and 13 pbw sodium dodecyl diphenyl ether disulfonate (51% active). For the examples using styrene and butadiene only, the styrene, with 0.25 pbw tert-dodecyl mercaptan dissolved therein, and the butadiene were then added. The reactor was sealed, heated with stirring to 50° C., and held at that temperature for 18 hours. The temperature was then raised slowly over a period of 5 hours to 65° C. The reactor mixture was cooled and purged of unreacted butadiene; aliquots of the resulting SBR latex was taken for characterization. This procedure was used to prepare several SBR latices having varying ratios of styrene and butadiene.

The same procedure is followed when acrylonitrile or butyl acrylate is added in which cases (Examples 7 and 8) these monomers are added to the reactor with the styrene and butadiene. The formulation and characterizations for each substrate are summarized in Table I.

Each of the above substrates (except for Example 9) was grafted with SAN, using the following formulation:

| Ingredients | pbw |
|---|---|
| Water (demineralized) | 180.0 |
| SBR latex (solids) | 65.0 |
| Sodium formaldehyde sulfoxylate (SFS) | 0.0750 |
| EDTA | 0.0225 |
| Ferrous sulfate heptahydrate | 0.0075 |
| Tert-dodecyl mercaptan | 0.50 |
| Cumene hydroperoxide | 0.50 |
| Styrene | 28.0 |

| Ingredients | pbw |
|---|---|
| Acrylonitrile | 7.0 |

A round bottom, three necked flask filled with stirrer, thermometer, condenser and dropping funnel was charged with the water, latex and tert-dodecyl mercaptan. The SFS, EDTA and ferrous sulfate were dissolved in a small amount of water and then added to the reactor. The mixture was stirred and heated to 55° C. The styrene, cumene hydroperoxide and acrylonitrile were added continuously to the stirred reaction mixture over a 60 minute period, while maintaining the temperature below 77° C., using external cooling as necessary to remove excess heat generated by the exothermic polymerization reaction. The reactor mixture was then maintained at 77° C. with stirring for an additional hour, cooled, and an antioxidant was added to the mixture. The mixture was stirred for an additional period, then coagulated in aqueous sulfuric acid. The coagulated resin was collected by filtration, washed with demineralized water and dried.

The same procedure is followed for Example 9 except that the reactor is charged with 3 pbw acrylonitrile and 4 pbw methacrylonitrile instead of the 7 pbw acrylonitrile.

The refractive indices for each preparation were measured on films at 23° C., using an Abbe refractometer. The results are summarized in Table I.

TABLE I

| EX. N | 1 | 2 | 3 | 4 | 5 | 6 | 7 | 8 | 9 | A |
|---|---|---|---|---|---|---|---|---|---|---|
| Substrate | | | | | | | | | | |
| Styrene pbw | 30.0 | 25.0 | 20.0 | 15.0 | 10.0 | 5.0 | 15.0 | 15.0 | 25.0 | — |
| Butadiene pbw | 69.0 | 74.0 | 79.0 | 84.0 | 89.0 | 94.0 | 79.0 | 79.0 | 74.0 | 100 |
| Acrylonitrile pbw | — | — | — | — | — | — | 5.0 | — | — | — |
| Butyl Acrylate pbw | — | — | — | — | — | — | — | 5.0 | — | — |
| DVB pbw | 1.0 | 1.0 | 1.0 | 1.0 | 1.0 | 1.0 | 1.0 | 1.0 | 1.0 | — |
| Refr. Ind. | 1.5400 | 1.5495 | 1.5470 | 1.5449 | 1.5425 | 1.5401 | 1.5449 | N.D. | N.D. | 1.5418 |
| Graft Polymer | | | | | | | | | | |
| Substrate, pbw | 65 | 65 | 65 | 65 | 65 | 65 | 65 | 65 | 65 | 45 |
| Styrene | 28 | 28 | 28 | 28 | 28 | 28 | 28 | 28 | 28 | 40 |
| Acrylonitrile | 7 | 7 | 7 | 7 | 7 | 7 | 7 | 7 | 3 | 15 |
| Methacrylonitrile | — | — | — | — | — | — | — | — | 4 | — |
| Refr. Ind. | 1.5534 | 1.5495 | 1.5470 | 1.5449 | 1.5425 | 1.5401 | 1.5449 | N.D. | N.D. | 1.5418 |

Notes:
Preparations described in text; all Examples employ constant MVA/EUN graft ratio (4/1) and are carried to same degree of conversion.
DVB = divinyl benzene.
N.D. = not determined.

EXAMPLES 10–15

Clear, Impact Modified PVC

Blends of PVC with the impact modifiers of Examples 1-6 were prepared by milling the following formulation on a two roll mill at 325° F. for 8 minutes. The compositions were sheeted out, and cooled. Specimens for testing were prepared by compression molding at 350° F.

| Ingredients | pbw |
|---|---|
| PVC | 100.00 |
| Tin mercaptide stabilizer | 2.0 |
| Acrylic process aid | 2.0 |
| Lubricants | 1.3 |
| Toner | 0.075 |
| Impact Modifier | 14 |

The PVC used was obtained as K55 extrusion grade PVC 221 Resin from Hooker Chemical Company. The impact and optical properties for the impact modified PVC compositions are summarized in Table II. Optical properties were obtained on 0.070 in. (70 mil) melt-pressed specimens.

TABLE II

| EX. NO. | 10 | 11 | 12 | 13 | 14 | 15 | B |
|---|---|---|---|---|---|---|---|
| PVC, pbw | 100 | 100 | 100 | 100 | 100 | 100 | 100 |
| Impact Modif. | | | | | | | |
| Ex. No. | 1 | 2 | 3 | 4 | 5 | 6 | A |
| pbw | 14 | 14 | 14 | 14 | 14 | 14 | 14 |
| Izod Impact | 2.0 | 9.0 | 9.0 | 8.5 | 9.2 | 10.4 | 1.1 |
| Optical Properties: | | | | | | | |
| Transm. (%) | 83.96 | 85.20 | 85.74 | 85.20 | 83.62 | 83.56 | 84.61 |
| Haze | 4.09 | 3.79 | 3.89 | 2.47 | 3.14 | 4.69 | 2.63 |
| Y. I. | 14.00 | 12.16 | 4.04 | 4.83 | 4.42 | 4.76 | 6.95 |

Notes:
Izod Impact = ft lb/in notch at 23° C., ⅛" samples at 23° C.; ASTM D-256 A
Optical properties as measured by Hunterlab Huntermeter by standard Hunter lab procedures.

Examples 11-15 demonstrate the excellent transparency and clarity that result for PVC compositions impact modified with the ABS composition of this invention. Though the transparency of all samples is good as shown by light transmittance values, the haze level is lowest for the composition (Example 13) having a styrene level in the substrate of 15%. Yellowness index, a second measure of clarity, was increased significantly in the compositions of Examples 10 and 11, both having styrene content in the substrate of more than 22%. (25% for Example 11 and 30% for Example 10). Good light transmittance coupled with a good degree of clarity thus results using impact modifiers based on SBR rubbers having from 78 to 94 wt% butadiene, and from 5 to 20 wt% styrene.

It will also be apparent that, contrary to the teachings of the prior art, these clear impact modifiers impart an excellent level of impact resistance to PVC. The compositions of Examples 10-15 have substantially the same rubber content, 65 wt%. However, for compositions with substrates having a higher level of styrene (30 wt%, Example 10), the impact is low. It will be apparent that the optimum combination of impact properties, light transmittance and clarity results for compositions based on SBR rubber substrates having from 5-20 wt% styrene and from 78 to 94 wt% butadiene.

Control Example B demonstrates the optical properties that obtain when a butadiene substrate is employed, together with sufficient SAN grafting superstrate to provide the necessary refractive index match. Note the substantial increase in yellowness index, as well as the substantially reduced impact properties.

EXAMPLES 16-21

Impact modifiers with varying levels of rubber substrate were prepared with the substrate of Example 4, using substantially the procedures of Example 1-6. The resulting impact modifiers were then blended with PVC using the processes employed in the preparation of Examples 10-15. The compositions and properties of the impact modifiers and the corresponding PVC blends are summarized in Table III.

TABLE III

| Ex. No. | 16 | 17 | 18 | 19 | 20 | 21 |
| --- | --- | --- | --- | --- | --- | --- |
| Modifier |  |  |  |  |  |  |
| Substrate |  |  |  |  |  |  |
| Ex. No. | 4 | 4 | 4 | 4 | 4 | 4 |
| pbw | 55 | 60 | 65 | 70 | 75 | 80 |
| Graft Monomers |  |  |  |  |  |  |
| Styrene, pbw | 36 | 32 | 28 | 24 | 20 | 16 |
| Acrylonitrile pbw | 9 | 8 | 7 | 6 | 5 | 4 |
| Refr. Ind. | 1.5500 | 1.5480 | 1.5449 | 1.5433 | 1.5417 | N.D. |
| PVC Blend |  |  |  |  |  |  |
| PVC pbw | 100 | 100 | 100 | 100 | 100 | 100 |
| Modifier pbw | 14 | 14 | 14 | 14 | 14 | 14 |
| Izod Impact | 1.5 | 3.5 | 8.5 | 7.6 | 6.9 | 7.2 |
| Optical Properties |  |  |  |  |  |  |
| Transm. (%) | 84.74 | 86.32 | 85.20 | 85.64 | 84.20 | 83.01 |
| Haze | 4.33 | 2.55 | 2.47 | 2.83 | 3.63 | 4.46 |
| Y. I. | 8.40 | 5.99 | 4.83 | 4.14 | 3.20 | 2.87 |

Notes:
See notes to Table II; N.D. = not determined.

It will be apparent from a consideration of Examples 16-21 that optimum clarity and impact result using impact modifiers having about 65 wt% SBR substrate (Example 18). At rubber levels much below 65 wt%, as in Examples 16 (55%) and 17 (60%), the yellowness index increases, and impact properties are considerable lower. With increases in rubber level above 65%, and particularly above 70% (Example 13) haze increases significantly, and both impact and transmittance are somewhat decreased.

It will be apparent that the refractive index of Examples 20 and 21 might possibly be adjusted by further increasing the S/AN ratio in the grafting monomers. However, as is well known in the art, the presence of a minimum amount of acrylonitrile is required to achieve compatibility between the impact modifier and PVC. Further decreases in acrylonitrile will thus increase the haze level, further reducing clarity. Similarly, the refractive indices of the modifiers of Examples 16 and 17 could be adjusted by reducing the SAN ratio. However, as is well known in the art and illustrated by the yellowness indices for Examples 16-21, increasing levels of acrylonitrile will further raise the yellowness index.

EXAMPLE 22

A clear impact modifier was prepared without including divinyl benzene cross-linking monomer, using the processes of Examples 1-6. The following formulation was used:

| | |
| --- | --- |
| SBR Substrate | |
| Styrene | 15.0 pbw |
| Butadiene | 85.0 |
| Refr. Ind. | 1.5265 |
| Graft Copolymer | |
| Styrene | 28.0 pbw |
| Acrylonitrile | 7.0 |
| SBR | 65.0 |
| Refr. Ind. | 1.5440 |

The above impact modifier was compounded with PVC, using the materials and procedures of Examples 10-15. The formulation used and properties obtained were:

| | |
| --- | --- |
| PVC | 100 |
| Modifier | 14 |
| Izod Impact | 8.3 |
| Light Transm. | 83.86 |
| Haze | 3.06 |
| Y.I. | 4.26 |

It will thus be apparent that such compositions based on butadiene based substrates without conventional crosslinking monomers also provide acceptable clear impact modifiers.

EXAMPLES 23 AND 24

To illustrate the use of monovinyl aromatic compounds other than styrene, PVC compositions were prepared using a-methyl styrene and p-methyl styrene as replacing all or a portion of the styrene monomer in the grafting of the impact modifier. The results are set forth in Table IV.

Further modifications and variations, particularly in the method of preparation and compounding of the clear impact modifiers of this invention will be apparent to those skilled in the art. Such modifications and variations may be made without departing from the spirit and scope of the invention which is defined solely by the appended claims.

TABLE IV

|  | Example | |
|---|---|---|
|  | 23 | 24 |
| Styrene | 22.0 | — |
| x-methyl styrene | 6.0 | — |
| p-methyl styrene | — | 28.0 |
| acrylonitrile | 7.0 | 7.0 |
| SBR[1] | 65.0 | 65.0 |
| Graft $nD^{25}$ | | |
| Found | 1.5432 | 1.5405 |
| Calculated | 1.5436 | 1.5400 |
| Difference | 0.0004 | 0.0005 |
| Parts (by weight) | | |
| Graft Copolymer | 8.0 | 8.0 |
| PVC[2] | 105.0 | 105.0 |
| Notched Izod Impact (ft 16/in ⅛" @ 23° C.) | 4.2 | 14.8 |
| Optical Properties: | | |
| Light Transmittance | 82.70 | 83.13 |
| Haze | 4.48 | 4.04 |
| Yellowness Index | 5.70 | 5.47 |

Notes:
[1]Typical SBR used in Example 2.
[2]Same PVC as used in Table II.

We claim:

1. An impact modifier for transparent poly(vinyl choride) prepared by grafting:
   A. a rubbery, butadiene based substrate containing:
   (i) 78–95 wt% butadiene,
   (ii) 22–5 wt% styrene,
   (iii) 0–15 wt of at least one of acrylonitrile and an alkyl acrylate containing four or more carbon atoms, and
   (iv) 0–2 wt% of a copolymerizable crosslinking agent, with;
   B. a monomer mixture containing:
   (i) one or more monovinyl aromatic compounds,
   (ii) an ethylenically unsaturated nitrile, the ratio of B(i) to B(ii) being from 3/1 to 5/1,
   (iii) 0–2 wt% of a copolymerizable crosslinking agent,
   (iv) 0–2 wt% of a chain transfer agent, and
   (v) 0–2 wt% of a graft enhancing agent
   said substrate being 100 parts by weight in the presence of from 40 to 70 parts by weight of said monomer mixture.

2. The composition of claim 1 wherein the amount of monomer mixture is from 47 to 61 parts by weight per hundred parts by weight of said substrate.

3. The composition of claim 2 wherein the weight ratio of said monovinyl aromatic compound(s) to said ethylenically unsaturated nitrile is about 4 to 1.

4. The composition of claim 1 wherein said monovinyl aromatic compound is selected from the group consisting of (a) styrene, (b) methyl styrene and (c) p-methyl styrene and mixtures of (a), (b), or (c).

5. The composition of claim 1 wherein said ethylenically unsaturated nitrile is selected from the group consisting of (a) acrylonitrile, (b) methylacrylonitrile and (c) mixtures of (a) and (b).

6. The composition of claim 5 wherein said ethylenically unsaturated nitrile is acrylonitrile.

* * * * *